(No Model.)

F. MASSET & E. HARTIG.
TIRE FOR WHEELS.

No. 548,619. Patented Oct. 22, 1895.

Witnesses:
Jno. A. Christianson.
Rudolph M. Lotz.

Inventors.
Ferdinand Masset
Eduard Hartig
By Harry Cobb Kennedy Atty

UNITED STATES PATENT OFFICE.

FERDINAND MASSET AND EDUARD HARTIG, OF CHICAGO, ILLINOIS.

TIRE FOR WHEELS.

SPECIFICATION forming part of Letters Patent No. 548,619, dated October 22, 1895.

Application filed July 23, 1895. Serial No. 556,932. (No model.)

*To all whom it may concern:*

Be it known that we, FERDINAND MASSET and EDUARD HARTIG, citizens of the United States, residing at Chicago, in the county of Cook and State of Illinois, have invented certain new and useful Improvements in Tires for Wheels; and we do hereby declare the following to be a full, clear, and exact description of the invention, such as will enable others skilled in the art to which it appertains to make and use the same.

This invention relates to a novel construction in a tire for wheels, the object being to provide a tire of simple and durable construction which will give the same elasticity as a pneumatic tire without the accompanying annoyance attendant upon puncturing; and it consists in the features of construction and combinations of parts hereinafter fully described and claimed.

Figure 3:
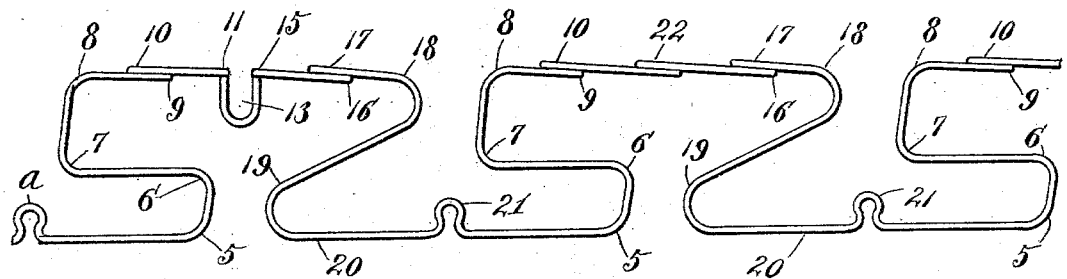
Figure 4:
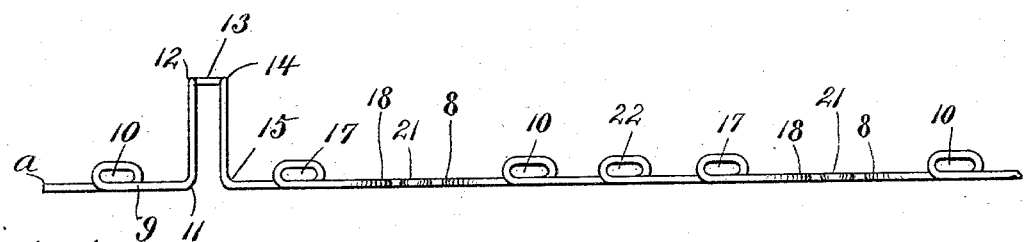
Figures 1, 5:
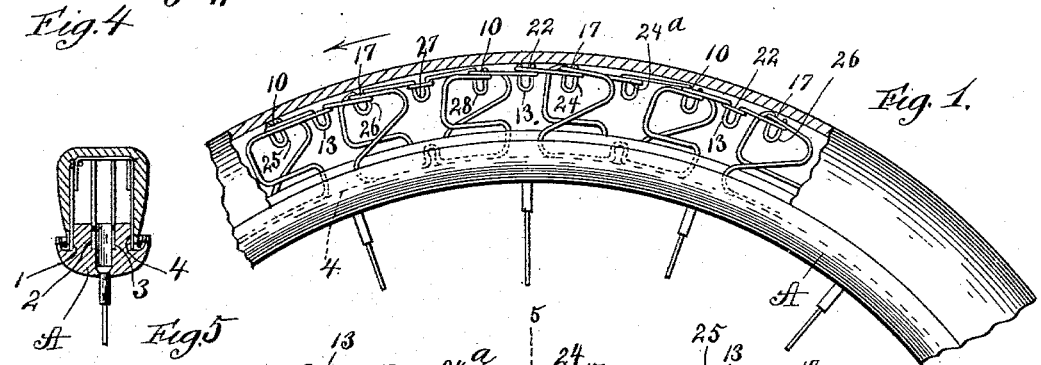
Figure 2:
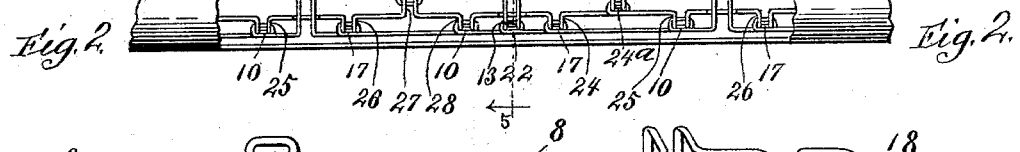
Figure 6:
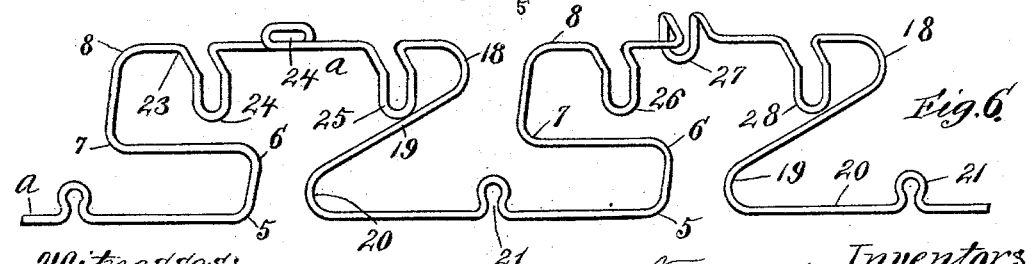

In the accompanying drawings, illustrating our invention, Figure 1 is a side elevation of a tire constructed in accordance with our invention with the covering partially removed. Fig. 2 is a top plan view of the same with the covering partially removed. Figs. 3 and 4 are detail views in elevation showing the form of the outer wires composing our tires. Fig. 5 is a sectional view taken on the line 5 5 of Fig. 2. Fig. 6 is a perspective view of the inner or middle wires composing our tire.

The main object of our invention is to provide a tire which will run smoothly and overcome the objections to pneumatic tires—namely, their liability to become useless through puncture. Besides this we believe that by means of our construction greater speed can be obtained for the same expenditure of power than can now be attained by any tire at present in use.

Referring now to said drawings, A indicates an ordinary wood tire, which is provided with a series of peripheral grooves 1, 2, 3, and 4, in which the wires composing our tire are held.

The outer wires of our tire are bent in the following manner: We will suppose that *a* is the starting-point and lies at the bottom of the outer groove in said tire, the portions of the wires thus lying being termed the "bases" and the outermost portions the "periphery" thereof. Beginning at *a*, then, which for convenience we have shown to be near the middle of one of the said bases, the said wire runs straight to the point 5, where it is bent upwardly and forwardly a short distance to 6 and is then bent backwardly, preferably about parallel with said base, to a point 7, the length of said wire between said points 6 and 7 being less than one-half the length of said base. It is then bent upward about parallel with said portion between the points 5 and 6 to a point 8, thence forward about parallel with said base to a point 9, where it is bent back in a loop to form an eye 10, which is situated midway between the middle and end of the said peripheral portion. It is then continued forward to the point 11, adjacent to the middle of said peripheral portion, where it is bent at about a right angle thereto and extends horizontally a distance almost equal to the distance between the grooves 1 and 4 to a point 12, where it is bent downwardly to form a tongue 13, then upwardly to the point 14, from which it runs back to a point 15 on said peripheral portion. It then extends forward to the point 16, where it is bent back to form an eye 17, which is situated the same as the eye 10 with relation to distance from the middle of said peripheral portion and is continued forward to the point 18, where it is bent downwardly and extends back at an acute angle to said base and peripheral portion to a point 19. It is then bent around to a point 20, where the next of said bases begins. At the middle portion of said bases said wire is bent upwardly in a loop 21 to give it greater elasticity. From this point the wire is bent to form another peripheral portion in the same manner as the previous one, with the exception that an eye 22 is substituted for the tongue 13 on the previous peripheral portion. These peripheral portions are alternated, and when said wires are in position on said tire the peripheral portions having the tongue 13 are opposite the peripheral portions having the three eyes, said tongues 13 on one wire fitting into the eyes 22 on the opposite wire. The said middle wires are bent in the same manner as said outside wires, the difference being in the manner of bending the peripheral portions thereof. To the point 8 said wires coincide in shape with said outside wires and then extend to the point 23, where they are bent over to form a tongue 24, in the same manner as the tongue 13 is bent on said outside wires.

Said tongue 22 is situated midway between the middle portion of said peripheral portion and extends from this wire, which I will refer to as lying in the groove 2 and enters the eye 10 in the wire lying in groove 1. At the middle of said peripheral portion an eye 24 is formed in said wire, and equidistant therefrom on the other side another tongue 25 is formed, which is of equal size and extent as said tongue 23 and is adapted to enter the eye 17 in the wire lying in groove 1. From this point said wire is bent in the same manner as said outside wires to the next peripheral portion, which is provided with tongues 26, 27, and 28, having the same relative positions as said tongues 23 and 25 and said eye 24. Said tongues 26 and 28, however, extend in the opposite direction and enter the eyes 17 and 10, respectively, in the outside wire lying in grooves 4. The middle tongue 27 on said inside wire enters the eye 24 in said other inside wire lying in groove 3. The peripheral portions of said inside wires are alternately provided with two tongues and one eye and three tongues. The relative positions of the said parts of each of said peripheral portions are also alternated in the following manner—that is, if the tongues 23 and 25 on the first peripheral portion of said wires provided with the eye 24 at the middle extend to the right in the next of said peripheral portions they will extend to the left, or vice versa. In the same manner, where the tongues 26 and 28 extend to the left and the middle tongue 27 extends to the right in the next of such peripheral portions having three tongues, the tongues 26 and 28 extend to the right and the tongue 27 to the left. When all said wires are in position to form said tire, their relative positions will be as follows:

In the outside wire lying in groove 1 the peripheral portions provided with the tongues will lie opposite the peripheral portion of the wire lying in groove 4, having the three eyes 10, 22, and 17, and said tongues 13 on said wire in groove 1 will enter the eyes 22 in said wire in groove 4, and vice versa. The peripheral portions of said inside wires will lie alternately between the peripheral portions of said outside wires, and the peripheral portions of said inside wires, having the tongues 26, 27, and 28, will lie opposite the peripheral portions of the other of said inside wires, having the eye 24 and tongues 23 and 25. The said tongues 27 on said inside wires will enter the eyes 24 in the opposite wire. The tongues 23 and 25 will enter the eyes 10 and 17, respectively, in the adjacent outside wire, and the tongues 26 and 28 will enter the eyes 17 and 10, respectively, in the other outside wire, the tongues 23 and 26 being opposite each other and entering eyes 10 and 17, respectively, in opposite outside wires and in one pair of said peripheral portions of said outside wires and the tongues 25 and 28 being opposite each other and entering eyes 17 and 10 in the adjacent pair of peripheral portions of said outside wires. By means of our manner of bending these wires a weight upon the wheel sufficient to contract them will be thrown slightly forward and in this manner given an impetus. In this manner a slight distance is gained at every revolution. Thus, for instance, if the circumference of the wheel is ten feet, we estimate a gain of about one-half inch for each revolution, thus making ten feet and one-half inch.

We prefer to use piano-wires in our construction, as we find that these have the greatest resiliency.

By our construction the weight will be thrown mainly upon the portions of the springs between the points 18 and 20, and as the point 18 lies upon the outer covering 29 of said tire and cannot give said portion must turn upon that point as a pivot, thus obviously throwing the weight forward a slight distance, which, multiplied by the total number of such portions of said pairs of wires, will give the total gain per revolution.

We claim as our invention—

1. A tire for wheels comprising a rim having peripheral grooves therein, and a spring wire tire adapted to be held within said grooves, said tire consisting of a series of practically parallel wires having tongues and eyelets, said tongues on one wire being adapted to enter said eyelets in said other wires whereby said wires are movably connected with each other, substantially as described.

2. A tire for wheels comprising a rim having peripheral grooves therein, and a spring wire tire adapted to fit within said grooves, said tire consisting of outer wires having tongues and eyelets, said tongues on one of said outside wires being adapted to enter eyelets on said other outside wire, and inner wire between said outside wires provided with tongues and eyelets, said tongues on said inner wires being adapted to enter eyelets in said outside wires and eyelets in the other inside wire, substantially as described.

3. A tire for wheels comprising a rim having peripheral grooves therein, and a spring wire tire adapted to fit within said grooves, said tire consisting of outer wires provided with tongues at regular intervals adapted to enter eyelets in the opposite outer wire, each of said outer wires being provided alternately with a tongue and an eyelet, and eyelets in said outer wires between each of said tongues and aforesaid eyelets adapted to receive tongues on wires situated between said outer wires, said inner wire being provided with eyelets to receive tongues on the adjacent inner wire, substantially as described.

In testimony whereof we affix our signatures in presence of two witnesses.

FERDINAND MASSET.
EDUARD HARTIG.

Witnesses:
RUDOLPH W. LOTZ,
D. J. NACHSEL.